United States Patent [19]

Forster et al.

[11] 3,882,181
[45] May 6, 1975

[54] PRODUCTION OF AMINES AND DIAMINES

[75] Inventors: Denis Forster, University City; Virgil W. Weiss, Kirkwood, both of Mo.

[73] Assignee: Monsanto Company, St. Louis, Mo.

[22] Filed: Sept. 2, 1971

[21] Appl. No.: 177,908

[52] U.S. Cl. ..... 260/583 N; 260/583 R; 260/583 P; 260/585 A
[51] Int. Cl. ..... C07c 85/04; C07c 85/16
[58] Field of Search ........ 260/585 A, 583 R, 583 P, 260/583 N

[56] References Cited
UNITED STATES PATENTS

| | | | |
|---|---|---|---|
| 3,422,145 | 1/1969 | Steinmetz | 260/585 A |
| 3,790,634 | 2/1974 | Weiss | 260/583 N |

*Primary Examiner*—Lorraine Weinberger
*Assistant Examiner*—Richard L. Raymond

[57] ABSTRACT

Production of amines by 1. contacting a halohydrocarbon with a large excess of an ammonium salt and a large excess of ammonia, followed by evaporation of excess ammonia after the formation of amine hydrohalide in the reaction mixture, and 2. separation of the reaction product comprising a mixture of amine hydrohalide and ammonium halide by contacting the said mixture with a solvent system comprising an organic solvent and from 1 mol percent to 50 mol percent of a modifier selected from the group consisting of ammonia, water, and methanol, leaving the said ammonium halide undissolved, removing the said solid ammonium halide, 3. subjecting the said solvent system to a precipitation treatment such as by removing the said modifier with the resultant precipitation of the amine hydrohalide, and 4. neutralizing the said amine hydrohalide with a base to obtain the free amine.

6 Claims, No Drawings

PRODUCTION OF AMINES AND DIAMINES

This invention relates to a new method for the production of primary mono and diamines and salts thereof as exemplified by hexamethylenediamine and its salts.

Amines such as hexamethylenediamine are valuable chemical intermediates used for example, in the synthesis of polyamides. Several commercial processes for the production of hexamethylenediamine have been described. One of the methods described in the prior art consists of aminating 1,6-dihaloalkanes.

The reaction between ammonia and alkyl halides to give amines has been known for many years but has not been considered as a practical method for the production of primary amines because of the low selectivity. One method of improving the selectivity of the ammonolysis reaction is to include ammonium salts as inhibitors of subsequent reaction of the organic amines. This is taught in U.S. Pat. No. 3,422,145. The disadvantage of this technique, as taught heretofore, is that both the amine salt and the ammonium salt have to be neutralized by base before the free amine can be recovered. The expense of the extra caustic required for the ammonium salt and the low yield of amine (plus halide recovery in a continuous process) makes such a process economically unattractive.

It is an object of this invention to provide a process for the ammonolysis of halo compounds such as dihalohexanes and recovery of the reaction products which overcomes the abovementioned disadvantages.

It is a further object of this invention to provide a process for the ammonolysis of halogenated hydrocarbons such as dihalohexanes which improves the separation of amine products from ammonium salts, and reduces the caustic required in neutralization.

It is an object of this invention to provide a process for separating amine salts such as hexamethylenediamine salts from ammonium halide salts.

In accordance with the present invention, a feed component comprising a halogenated hydrocarbon such as dihalohexane is reacted with ammonia and an excess of ammonium halide with all of the reaction components present in one or more liquid phases. It is advantageous to add the dihalohexane slowly.

After the reaction to produce the amine salts is complete, the ammonia is evaporated, and the resulting mixture of amine hydrohalide salts and ammonium halide is contacted with an organic solvent, e.g., butanol, containing a small proportion of a member of the class of ammonia, water or methanol (herein termed the modifiers). The solvent modified in this way extracts the amine salts and leaves the ammonium halide undissolved.

The present use of the modifiers in the solvent systems has been found to give results unpredictable from prior knowledge of the solubility of amine salts and ammonium salts in organic solvents. The present results are particularly surprising since previous experience has been that amine salts, especially diamine salts are substantially insoluble in organic solvents.

The solvent containing the dissolved amine salt can be filtered or decanted from the undissolved ammonium halide and the amine salts recovered such as by: (a) removal of the modifying component, namely ammonia, water or methanol, such as by volatilization, whereupon the amine salts crystallize out and can be separated by decantation or filtration, (b) cooling the extracting solvent whereupon the said amine salts crystallize and can be separated by decantation or filtration, (c) washing the extracting solvent with a further solvent such as an excess of water which is substantially immiscible with the said extracting solvent and which selectively dissolves the amine salts.

The amine salts obtained by this process can then be treated with a base such as sodium hydroxide, potassium hydroxide or calcium oxide in solution or as the solid to liberate the free amines.

In the practice of the present invention, the halogenated hydrocarbons include mono and dihalogenated alkyl and aryl compounds having from 1 to 25 carbon atoms. Examples include chloromethane, allyl chloride, n-bromobutane, 1,6-dibromohexane, 1,8-dibromooctane, 1-chlorododecane, chlorobenzene, iodobenzene, and 2-chlorododecane.

As exemplified for the production of hexamethylenediamine, the reaction system for the production of this amine salt comprises ammonia, ammonium salt and a dihalohexane. Suitable ammonium salts are the halides, acetate, formate and other carboxylic acid salts, nitrate, thiocyanate and other salts which are soluble in liquid ammonia. The preferred salt depends on the dihalohexane being reacted, i.e., for dichlorohexane the preferred salt is ammonium chloride, for dibromohexane the preferred salt is ammonium bromide, etc.

The reaction is carried out with the ratios of the reactants as follows: 1 mole of dihalohexane to at least 30 moles of ammonium salt and at least 40 moles of ammonia. It is found to be advantageous to add the dihalohexane to the mixture of ammonia and ammonium halide slowly. The preferred reactant ratios are 1 mole of dihalohexane to 40–300 moles ammonia and 30–75 moles ammonium salt. The preferred temperature range is 20°–120°C which requires pressures in the general range of 20 to 500 psig. Such pressures are considerably lower than are found to result when the ammonium salt is not present.

Although the prior art includes references to the use of ammonium salts to improve selectivity in ammonolysis of haloalkanes, the inability to separate the resulting amine salts from the said ammonium salts has heretofore precluded use of these additives in substantial excess. The present novel separation procedure provides an advantage of using large excesses of ammonium halide in conjunction with ammonia in ammonolysis of haloalkanes. It has now been found that the use of 1 mole of the halohydrocarbon together with at least 30 moles of an ammonium salt such as ammonium bromide, or ammonium iodide (preferably 30 to 75 moles) together with at least 40 moles of ammonia (preferably 40 to 300 moles) achieves the present superior results. In comparison the use of 1 mole of halohydrocarbon with only 20 moles of ammonium bromide gives a selectivity to primary amine of only 79 percent relative to selectivities of about 96% for the present invention.

An unexpected advantage accrues from carrying out the reaction with a ratio of reactants as described above (40 moles $NH_4Br$) namely a substantial increase in the selectivity to primary amine such as hexamethylenediamine. There is also a substantial reduction in the pressure of the reaction compared with processes described in the prior art.

In the preferred embodiment of the invention, after completion of the amination reaction, the excess ammonia is evaporated and the resulting solid mixture is contacted with an organic solvent containing a specific amount, e.g., 1 mol percent to 50 mol percent (referred to the organic solvent) of ammonia, water or methanol as a modifying component. Any organic solvent is suitable for this process, in the presence of the modifier, except those that react with either amines or ammonia, if ammonia is the modifier. The modifiers acting in conjunction with the primary organic solvents, bestow on the solvent the property of being able to preferentially dissolve amine salts and leave undissolved the ammonium halides.

The above solution of the amine salts, e.g., hexamethylenediamine dihydroiodide, can subsequently be separated from the undissolved ammonium salts, e.g., $NH_4I$ by filtration or decantation. After decantation, the hexamethylenediamine salts can be obtained from this solution in the extraction solvent in a number of ways, for example: (a) by removal of the modifying component in the solvent system by evaporation, causing the amine salts to precipitate and allowing their collection by decantation or filtration, or (b) washing the organic solvent with water, in which the amine salts are very soluble. The amine salts thus obtained can then be treated with caustic to obtain the free amines.

In the present invention it has been found that organic solvents, preferably polar organic solvents such as alcohols used in the presence of specific minor proportions of ammonia, water or methanol, make it possible to extract selectively the amine salt such as hexamethylenediamine described above. Polar organic solvents which are useful in the practice of the present invention include various alcohols such as ethylene glycol, propanols, butanols, pentanols, hexanols, phenol, heptanols, octanols, etc. In general mono-alcohols and di-alcohols having from 2 up to 20 carbon atoms may be used.

Other polar organic solvents which are useful include the following representative compounds: nitriles and nitrocompounds such as nitroethane, nitrobenzene, acetonitrile, adiponitrile, and di-N-substituted acid amides such as dimethyl formamide. The solvents preferably have from 2 to 20 carbon atoms.

Other useful solvent compounds include ethers of 2 to 20 carbon atoms such as dipropylether and aromatic halo-compounds such as chlorobenzenes, and sulfur containing compounds such as dialkylsulfoxide, exemplified by dimethylsulfoxide.

The above organic solvents such as the alcohols, ethers, nitriles or halogenated compounds are used with a modifying proportion, e.g., about 1 mol percent to 50 mol percent of ammonia, water or methanol. The modified solvents can be prepared by mixing the solvent and the modifier in the desired proportions. However, it is advantageous, if ammonia is the modifier, not to evaporate all of the excess ammonia from the initial reaction mixture. The mixture containing the residual ammonia is then mixed with pure solvent, allowing this residual ammonia to act as the modifier.

The following examples illustrate certain specific embodiments of the invention but are not limitative of the invention.

EXAMPLE 1

Seventeen gm of anhydrous ammonia and 39.4 gm of ammonium bromide are charged to a steel autoclave (300 ml) equipped with a Magne-dash stirrer. The temperature is raised to 50°C and stirring commenced. A charge of 2.44 gm of 1,6-dibromohexane is added over a period of 3 hours during which time the pressure in the system remains at less than 100 psig. The weights of the reaction components represent ratios of 100 moles ammonia and 40 moles ammonium bromide to 1 mole of dibromohexane. The reaction is continued for a further 30 minutes following completion of the addition of dibromohexane after which 15 gm of ammonia are vented. Forty gm of n-amyl alcohol (0.45 mole) is added to the residue giving a solvent modified with 21 mol percent of ammonia. The resulting mixture is heated to 100°C and the solvent decanted from the solid residue. An equal proportion of fresh n-amyl alcohol solvent is added together with about 21 mole percent ammonia and the procedure is repeated until all of the hexamethylenediamine dihydrobromide salt is extracted, leaving a residue of ammonium bromide (both the original charge plus byproduct ammonium bromide). After combining the n-amyl alcohol extracts, the ammonia is evaporated, whereupon the hexamethylenediamine salts precipitate and are filtered off. Treatment of the amine salts with sodium hydroxide liberates the free amines, which analysis shows to contain 97 percent hexamethylenediamine, with the only significant by-product being bis-hexamethylenediamine.

Similar results are obtained with the use of modified n-amyl alcohol solvent systems containing 5 mol percent ammonia and also 40 mol percent ammonia.

EXAMPLE 2

Seventeen gm of anhydrous ammonia and 39.4 gm of ammonium bromide are charged to a steel autoclave (300 ml) equipped with a Magne-dash stirrer. The temperature is raised to 50°C and stirring commenced. A charge of 2.44 gm of 1,6-dibromohexane is added over a period of 3 hours during which time the pressure in the system remains at about 90 psig. Such pressure is considerably less than is observed when the ammonium bromide is omitted. The weights of the reaction components represent ratios of 100 moles ammonia and 40 moles ammonium bromide to 1 mole of dibromohexane. The reaction is continued for a further 30 minutes following completion of the addition of dibromohexane after which 15 gm of ammonia are vented. Forty gm of cyclohexanol is added to the residue giving a solvent modified with 20 mol percent of ammonia. The resulting mixture is heated to 100°C and the solvent decanted from the solid residue. Fresh cyclohexanol solvent is added together with about 20 mol percent ammonia and the procedure is repeated until all of the amine salt is extracted. It can be discerned by someone skilled in the art that the above process can be carried out continuously with a series of decanters. After combining the cyclohexanol extracts, the ammonia is evaporated, whereupon the amine salts precipitate and are filtered off. Treatment of the amine salts with sodium hydroxide solution liberates the free amines which analysis show to contain 97 percent hexamethylenediamine, with the only significant by-product being bis-hexamethylenediamine.

EXAMPLE 3

This example when compared with Example 1 illustrates the advantages of conducting the reaction as in Example 1 with much higher concentrations of ammonium salt than heretofore thought practical.

The reaction is carried out as described in Example 1 except instead of 39.4 gm of ammonium bromide, 19.7 gm is used in the reaction mix. The weights of the reaction components represent ratios of 100 mols of ammonia and 20 moles ammonium bromide to 1 mol of dibromohexane. After an extraction and neutralization as described in Example 1, the selectivity to hexamethylenediamine is found to be 79 percent. In comparison, the method of the present invention, as shown in Example 1, gives a selectivity of 97 percent.

EXAMPLE 4

This example illustrates the use of another class of solvents for the amine salt-ammonium salt mixture described in Example 1.

The reaction is conducted as described in Example 1. After completing the reaction, 16 gm of ammonia is vented off, and 80 gm of adiponitrile is added to the reaction residue containing traces of residual ammonia. The mixture is heated to 100°C and the liquid decanted from the solid ammonium bromide. . This process is repeated using 10 similar charges of premixed adiponitrile/ammonia mixture consisting of adiponitrile containing 25 mol percent ammonia. The ammonia is evaporated from the combined extracts, and the amine salts washed out of the adiponitrile with water (about 100 gm). The product amines are freed from the salts by addition of caustic soda. The yield of 1,6-hexamethylenediamine is found to be 96 percent.

EXAMPLE 5

Seventeen grams of anhydrous ammonia and 16.0 gm of ammonium chloride are charged to a steel autoclave (100 ml) equipped with a Magne-dash stirrer. The temperature is raised to 150°C and stirring commenced. A charge of 1.1 gm of chlorobenzene is added over a period of 3 hours. The reaction is continued for a further 30 minutes following completion of the addition of the chlorobenzene after which 15 gm of ammonia are vented. Forty gm of n-amyl alcohol is added to the residue giving a solvent modified with about 21 mol percent of ammonia. The resulting mixture is heated to 100°C and the solvent decanted from the solid residue of ammonium chloride. An equal amount of fresh n-amyl aocohol solvent is added which contains approximately 21 mol % of ammonia and the procedure is repeated until all of the amine salt is extracted. After combining the n-amyl alcohol extracts, the ammonia is evaporated whereupon the amine salts precipitate and are filtered off. Treatment of the product aniline hydrochloride salt with 50 percent aqueous sodium hydroxide liberates the free amines as a separate phase containing 95 percent aniline.

EXAMPLE 6

Seventeen gm of anhydrous ammonia and 16.0 gm of ammonium chloride are charged to a steel autoclave (300 ml) equipped with a Magne-dash stirrer. The temperature is raised to 100°C and stirring commenced. A charge of 2.0 gm of 1-chlorododecane is added over 3 hours. The reaction is continued for 6 hours after completion of the addition. Fifteen gm of ammonia is then vented and 50 gm of n-amyl alcohol is added giving an extraction solvent modified with about 21 mol percent of ammonia. The mixture is heated to 100°C and then the amyl alcohol solvent is decanted from the undissolved ammonium chloride. On cooling the amyl alcohol extraction solvent, dodecylamine hydrochloride crystallizes out and is separated by filtration. Dodecylamine is then obtained by treatment of the hydrochloride salt with a strong base, e.g., potassium hydroxide as a 25 percent aqueous solution.

EXAMPLE 7

Seventeen gm of anhydrous ammonia and 39.4 gm of ammonium bromide are charged to a steel autoclave (300 ml) equipped with a Magne-dash stirrer. The temperature is raised to 50°C and stirring commenced. A charge of 2.44 gm of 1,6-dibromohexane is added over a period of 3 hours during which time the pressure in the system remains at less than 100 psig. The weights of the reaction components represent ratios of 100 moles ammonia and 40 moles ammonium bromide to 1 mole of dibromohexane. The reaction is continued for a further 30 minutes following completion of the addition of dibromohexane after which 16 gm of ammonia are vented. Forty gm of n-decyl alcohol modified with 20 mol percent methanol is added to the residue. The resulting mixture is heated to 100°C and the solvent decanted from the solid residue. An equal proportion of fresh n-decyl alcohol solvent containing 20 mol percent methanol is added and the procedure is repeated until all of the amine salt is extracted leaving a residue of ammonium bromide (both the original charge plus by-product ammonium bromide). It can be discerned by someone skilled in the art that the above process can be carried out continuously with a series of decanters. After combining the n-decyl alcohol extracts, the methanol is evaporated, whereupon the amine salts precipitate and are filtered off. Treatment of the amine salts with aqueous sodium hydroxide liberates the free amines, which analysis shows to contain 97 percent hexamethylenediamine, with the only significant by-product being bis-hexamethylenediamine.

EXAMPLE 8

The hexamethylenediamine (HMD) reaction is carried out as described in Example 1 and the extraction is carried out with a solvent system consisting of 85 mol percent n-butanol and 15 mol percent water. To illustrate the effect of the modifier (water) on the solvent properties, the dependence of solubility of hexamethylenediamine dihydrobromide (HMD·2HBr), and NH$_4$Br on water content in n-butanol is given in the following table.

The Effect of Water Content in n-Butanol on the Solubility of NH$_4$Br and HMD·2HBr at 90°C

| Mol % H$_2$O | Wt% H$_2$O | NH$_4$Br Solubility (gm/100 g solvent) | HMD·2HBr Solubility (gm/100 gm solvent) |
|---|---|---|---|
| 0 | 0 | 0.68 | 1.02 |
| 4.3 | 1 | 0.82 | 2.2 |
| 8 | 2 | 1.3 | 5.1 |
| 11 | 3 | 1.9 | 8.6 |
| 15 | 4 | 2.2 | 14.0 |
| 18 | 5 | 2.4 | 18.6 |
| 21 | 6 | 2.9 | 25.4 |

EXAMPLE 9

This example illustrates the use of another type of solvent for the extraction procedure described in Example 1.

The reaction is conducted as described in Example 1. After completion of the reaction, 16 gm of ammonia is vented off, and 80 gm of adiponitrile containing 25 mol percent of water is added to the reaction residue. The mixture is heated to 100°C and the liquid decanted from the solid ammonium bromide. This process is repeated using 10 similar charges of premixed adiponitrile/water mixture consisting of adiponitrile with 25 mol percent water. The water is evaporated from the combined adiponitrile extracts, and the amine salts washed out of the adiponitrile with a fresh charge of water (about 100 gm). The product amines are freed from the salts by addition of aqueous caustic soda. The yield of 1,6-hexamethylenediamine is found to be 96 percent.

EXAMPLE 10

Seventeen grams of anhydrous ammonia and 16.0 gm of ammonium chloride are charged to a steel autoclave (100 ml) equipped with a Magne-dash stirrer. The temperature is raised to 150°C and stirring commenced. A charge of 1.1 gm of chlorobenzene is added over a period of 3 hours. The reaction is continued for a further 30 minutes following completion of the addition of the chlorobenzene after which 16 gm of ammonia are vented. Forty gm of n-amyl alcohol modified with about 28 mol percent of methanol is added to the residue. The resulting mixture is heated to 100°C and the solvent decanted from the solid residue of ammonium chloride. An equal amount of fresh n-amyl alcohol/methanol solvent mixture is added and the procedure is repeated until all of the amine salt is extracted. After combining the n-amyl alcohol extracts, the methanol is evaporated whereupon the amine salts precipitate and are filtered off. Treatment of the product aniline hydrochloride salt with 50 wt percent aqueous sodium hydroxide liberates the free amines as a separate phase containing 95 percent aniline.

What is claimed is:

1. A process for production of hexamethylenediamine which comprises
   a. contacting a mole proportion of a 1,6-dibromohexane with an excess of at least 30 moles of an ammonium salt and an excess of at least 40 moles of ammonia followed by evaporation of excess ammonia after the formation of hexamethylenediamine-dihydrobromide in the reaction mixture, and
   b. separation of the reaction product comprising a mixture of hexamethylenediamine-dihydrobromide and ammonium bromide by contacting the said mixture with a solvent system comprising an organic solvent and from 1 mol percent to 50 mol percent of a modifier selected from the group consisting of ammonia, water and methanol, leaving the said ammonium bromide undissolved, removing the said solid ammonium bromide, and
   c. subjecting the said solvent system to a precipitation treatment by removing the said modifier with the resultant precipitation of the hexamethylene-dihydrobromide, and
   d. neutralizing the said hexamethylenediamine-dihydrobromide with a base to obtain the free hexamethylenediamine.

2. A process for separating hexamethylenediamine dihydrobromide from inorganic ammonium salts which comprises contacting a mixture thereof, with an organic solvent, the said organic solvent having present therein from 1 mol percent to 50 mol percent of a modifier selected from the group consisting of ammonia, water and methanol, and thereafter removing the solvent containing dissolved hexamethylenediamine dihydrobromide from the said insoluble inorganic ammonium salts.

3. A process for the separation of hexamethylenediaminedihydrobromide from ammonium bromide which comprises contacting a mixture thereof, with a solvent comprising n-butanol containing from 1 mol percent to 50 mol percent of a modifier selected from the group consisting of ammonia, water and methanol, and removing the solvent having dissolved therein the said hexamethylenediaminedihydrobromide from the insoluble residue of ammonium bromide.

4. A process as in claim 3 in which the said modifier is ammonia.

5. A process as in claim 3 in which the said modifier is water.

6. A process as in claim 3 in which the said modifier is methanol.

* * * * *